United States Patent [19]

Dolby et al.

[11] 3,818,244

[45] June 18, 1974

[54] LIMITERS FOR NOISE REDUCTION SYSTEMS

[75] Inventors: Ray Milton Dolby; David Peter Robinson, both of London, England

[73] Assignee: Dolley Laboratories Inc., New York, N.Y.

[22] Filed: Mar. 6, 1973

[21] Appl. No.: 345,228

Related U.S. Application Data

[62] Division of Ser. No. 107,624, Jan. 19, 1971.

[30] Foreign Application Priority Data

Jan. 23, 1970 Great Britain ...................... 3351/70

[52] U.S. Cl. ................................ 307/237, 307/251

[51] Int. Cl. ............................................ H03k 5/08

[58] Field of Search ........... 307/205, 221, 237, 251, 307/279, 304

[56] References Cited

UNITED STATES PATENTS

| | | | |
|---|---|---|---|
| 3,441,748 | 4/1969 | Werner | 307/304 |
| 3,482,174 | 12/1969 | James | 307/251 |
| 3,502,903 | 3/1970 | Wade | 307/304 |
| 3,525,880 | 8/1970 | Donnell | 307/237 |
| 3,538,320 | 11/1970 | Jansons | 307/279 |
| 3,543,169 | 11/1970 | Hill | 307/237 |

*Primary Examiner*—Rudolph V. Rolinec
*Assistant Examiner*—R. E. Hart
*Attorney, Agent, or Firm*—Dike, Bronstein, Roberts & Cushman

[57] ABSTRACT

Limiters are known utilizing a shunt FET rendered conductive by a smoothed control signal to attenuate a signal. In this invention distortion is reduced by effecting positive feedback of half of the FET output voltage via a control signal smoothing capacitor or by putting the FET across a balanced line on the output side of a phase splitter. Furthermore, by using two or more shunt FETs having different thresholds, better control of the attenuation characteristics over the whole dynamic range is possible.

5 Claims, 6 Drawing Figures

LIMITERS FOR NOISE REDUCTION SYSTEMS

Figure 1:
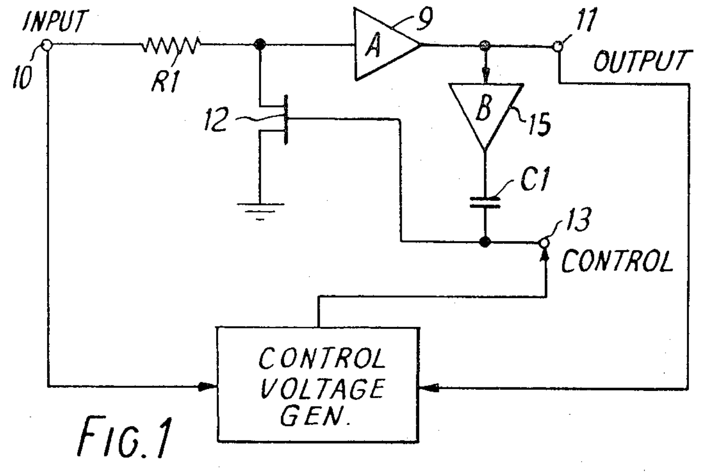

This is a division, of application Ser. No. 107,624, filed on Jan. 19, 1971.

This invention relates to limiters, especially limiters for noise reduction systems wherein compressors and expanders require controlled limiting of the amplitude of a signal. Examples of such systems are described in British Pat. No. 1,120,541 which, in particular, describes the use of the voltage-current characteristics of diodes in a balanced configuration to effect the required limiting. It is also known to use a field effect transistor (FET) as the principal element of a controlled limiter. The source-drain circuit of the FET shunts the signal path and the controlling signal is applied to the gate.

The present invention is concerned with improvements in FET limiters which enable distortion to be reduced and also enable the limiting characteristics to be established accurately without excessive reliance on the reproducibility of the FET characteristics. The reduction of distortion is particularly important in syllabic compressors and expanders intended for audio applications, although the invention is applicable to limiters in general, whether or not employed in noise reduction systems of the nature described in the abovementioned patent. In particular the invention can be embodied in limiters, as described in the abovementioned patent, which serve as filters with a variable cutoff frequency.

In a known method of reducing distortion in FET limiter circuits, one-half of the FET output voltage is added to the control voltage fed to the gate. This is accomplished by resistively combining the FET output voltage with the dc control voltage; the control voltage is necessarily attenuated in the process, which in some cases is wasteful of the control signal available.

The first object of this invention is to overcome this problem and to allow full use of the control voltage.

According to the present invention in one aspect, there is provided a limiter circuit comprising a signal path extending from an input to an output and including series impedance, the signal path being shunted by the source-drain circuit of a field effect transistor having its gate connected to a control terminal for control, by a control voltage, of the attenuation introduced by the transistor, the control terminal being connected to one or more smoothing capacitors for smoothing the control voltage, and a positive feedback loop which applies approximately half the transistor output voltage to the control terminal through the or a smoothing capacitor.

The above defined circuit is equivalent to a circuit in which the signal being limited is applied in anti-phase to the source and drain of the FET, thereby cancelling even order harmonics and consequently eliminating the major part of the distortion otherwise introduced by the FET. The invention also concerns a circuit in which this effect is achieved more directly.

Thus according to the invention in another aspect there is provided a limiter circuit comprising an input connected to a phase splitter whose two anti-phase outputs are connected through equal impedances to the source and drain respectively of a field effect transistor, an output coupled to at least one of the said source and drain, and a control terminal connected to the gate of the transistor for control, by a control voltage, of the attenuation introduced by the transistor.

Although the output can be taken simply from the source or the drain, this method has the disadvantage that any difference in the amplitudes of the two out of phase voltages or any differences in the two impedances will result in incomplete attenuation with the FET fully conducting. It is therefore preferred to connect the source and drain to the two inputs of a differential amplifier whose output provides the limiter output, this improvement also leading to a better signal to noise ratio in some instances.

Whether or not the differential amplifier is utilized, it is essential that the waveforms from the two phase splitter outputs should be identical. Any differences in distortion components will not cancel in the FET attenuator and will be passed at about half amplitude to the output.

The push-pull drive of the FET allows the FET to be operated at about 10 dB higher in level for a given distortion than a conventional single-ended FET attenuator, thereby improving the signal to noise ratio. The same improvement is also obtained with the previously described distortion reduction method.

With diode limiter circuits such as are described in the abovementioned patent it is possible to establish and reproduce the attenuation versus control voltage characteristics of the diode attenuators with a high degree of accuracy. Because of FET variability, a uniformly reproducible control characteristic is not easy to achieve on a production basis, and another object of the invention is to overcome this problem.

According to the invention in yet another aspect there is provided a limiter circuit comprising a signal path extending from an input to an output and including a plurality of series impedances followed by respective field effect transistors shunting the signal path, the gates of the transistors being connected to a single control terminal for control, by a control voltage, of the attenuation introduced by the transistors in an arrangement such that the transistors have difference thresholds of control voltage at which they start to conduct.

For noise reduction system applications, two transistors have been found to give good results, although more than two can be employed if required. Preferably the thresholds are such that the transistors start to conduct in order starting from the first, i.e., that nearest the input. The first to conduct provides the first few dB of attenuation, and by using fairly low associated impedances this attenuation can be well controlled, this being important in noise reduction applications. Then the next transistor starts to conduct to provide (assuming only two transistors) most of the remaining required attenuation, the first transistor becoming fully conducting to ensure an accurate value of the first stage attenuation.

The circuit with a plurality of transistors can be combined with either of the previously defined circuits utilizing either feedback through a smoothing capacitor or the use of a phase splitter, as explained in detail below.

The invention will be described in more detail, by way of example, with reference to the accompanying drawings, in which:

FIGS. 1 to 6 are schematic circuit diagrams of various embodiments of the invention.

In all the embodiments illustrated all impedances in the signal path are resistors but it will be appreciated that capacitors, inductors or complex impedances can be employed when it is desired to combine a limiting and filtering function, as mentioned above.

In FIG. 1 an input terminal 10 is connected to an output terminal 11 through a series resistor R1 and an amplifier 9 with gain A. The signal path is shunted by a FET 12 connected between the terminal 11 and ground. A control terminal 13 is connected to the gate of the FET for application of a control voltage which then determines the attenuation introduced by the FET. The control signal is generated by a circuit 14 which is shown, by way of example, connected to the input and output terminals 10 and 11. As explained in the abovementioned patent, the limiter control signal may be derived by rectifying and smoothing the input to and/or the output from the limiter.

One terminal of a final smoothing capacitor C1 is shown connected to the terminal 13. The other terminal of the capacitor is not grounded in the customary way but is connected to the output of an amplifier 15, of gain B which, together with amplifier 9, produces a total effective gain equal to one-half, the input of these amplifiers being connected to the FET output terminal. The gain relationship can also be expressed as $AB = ½$. The amplifier 15 has a low output impedance. In a practical circuit the amplifier 9 may have a high gain, with appropriate compensating attenuation in amplifier 15. It will therefore be seen that one half of the FET output voltage is fed back to the gate through the capacitor C1 to reduce the distortion introduced by the FET, without interfering with the smoothing action of the capacitor.

Figure 2:
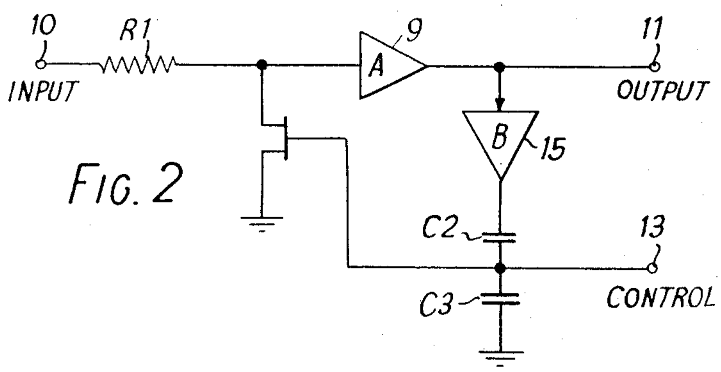

The control voltage generator 14 is omitted from the remaining Figures for simplicity. In FIG. 2 the factor of a half is introduced differently. The amplifier 9 and amplifier 15 have a total gain of AB. The smoothing capacitor C1 is split into capacitors C2 and C3, the sum of which equals C1. These operate as a voltage divider of ratio $1/(2AB)$ to feed back only half of the FET output voltage. In other words, it is arranged that $AB \times (C2/[C2 + C3]) = ½$.

Figure 3:
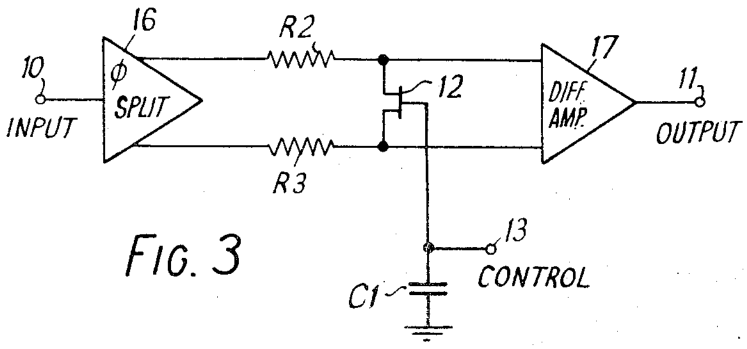

In FIG. 3 the input terminal 10 is connected to a phase splitter 16 whose two outputs are connected through two equal resistors R2 and R3 to the two inputs of a differential amplifier 17. The output terminal 11 is connected to the output of this amplifier. The push-pull signal path is shunted between the resistors and the differential amplifier by the attenuating FET 12, having its gate connected to the control terminal 13 and smoothing capacitor C1. Because of the balanced configuration, the even order distortion normally generated is substantially reduced.

Figure 4:
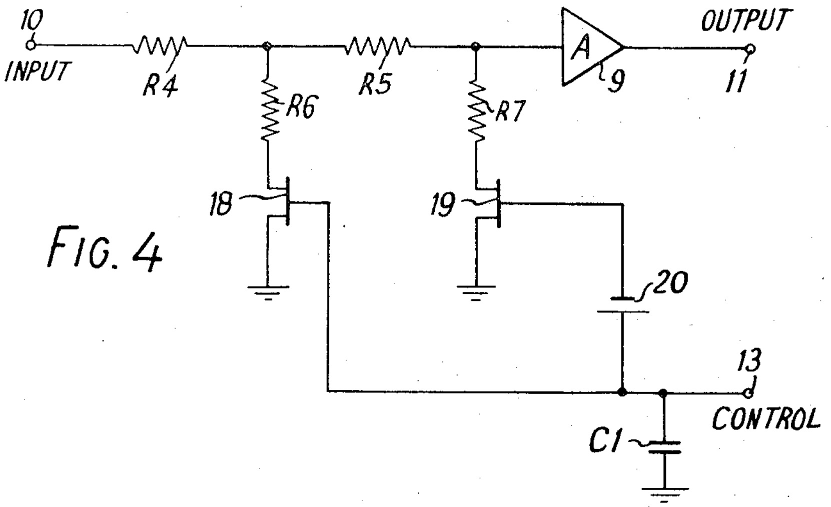

FIG. 4 shows a limiter in which two FET's are used to simplify obtaining the required characteristics. The input terminal 10 is connected to the output terminal 11 through two resistors R4 and R5 and the amplifier 9 in series. R4 is followed by a shunt arm consisting of a resistor R6 in series with a first FET 18. R5 is followed by a shunt arm consisting of a resistor R7 in series with a second FET 19. The control terminal 13 is connected to the gates of both transistors, but a bias voltage source, represented purely schematically as a battery 20, is put in the connection to the gate of transistor 19 only, whereby, as the control voltage on terminal 13 increases, initially only the transistor 18 starts to conduct, the transistor 19 subsequently beginning to conduct.

In practice, the bias source 20 might be a resistive divider to a fixed reference voltage a silicon diode, a zener diode, or a voltage developed from a signal in the limiter circuit itself or some external circuit. In the above biasing schemes, the transistors are matched with respect to pinch-off voltage. In an alternative method the gates are connected together to the terminal 13 and transistors with different pinch-off voltages are selected.

In the noise reduction application it is essential that the first few dB of attenuation should be well controlled and largely independent of the characteristics of the particular FET's used, which is best achieved by the use of fairly low value resistors R4 and R6. The first FET 18 is biased to start conducting before the second FET, and the first attenuator, comprising the first FET and the resistors R4 and R6 (which may be 10K and 4.7K respectively, for example), provides only a modest amount of attenuation (say 10 dB). After the first few dB of attenuation has been effected by the first FET, the second FET 19 begins to conduct and to provide most of the remainder of the attenuation require. In noise reduction systems the second FET thus provides most of the down-turning limiting characteristic required. Down-turning characteristics are explained in the above mentioned Patent. A high degree of accuracy and repeatability is achieved even at relatively high values of attenuation (e.g., 30 dB) because the first FET is fully conducting under these conditions, giving an accurate value of first stage attenuation.

In the noise reduction system application it is desirable that the limiting of transients should be symmetrical. The use of clipping diodes in this connection is described in the abovementioned patent. In the circuit of FIG. 4 for example, it is sometimes advantageous to use symmetrically biased clipping diodes at the output. The diodes prevent the generation of any asymmetrical signal components by either of the FET's during the limiter attack time, in which the large signal voltage applied may result in substantial FET nonlinearity.

Figure 5:
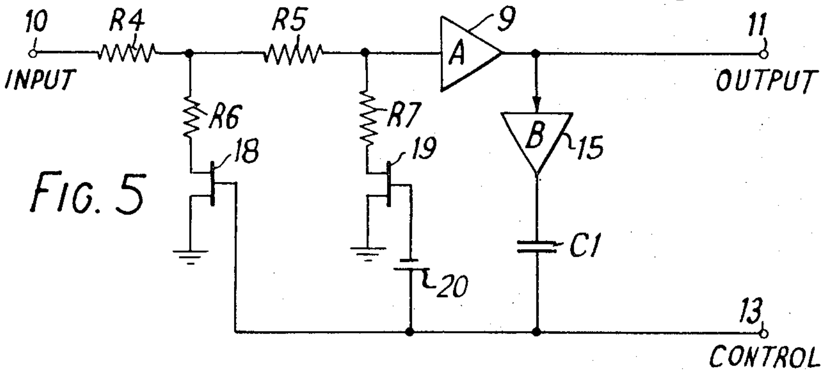

FIG. 5 illustrates one way of combining the advantageous features of FIGS. 1 and 4. Obviously FIGS. 2 and 4 could be similarly combined. In FIG. 5, the correction voltage fed to the smoothing capacitor C1 will reduce the distortion produced by the first FET attenuator (since the further attenuator is still cut off). When the second FET 19 begins to conduct (thereby reducing the distortion compensation voltage fed back), the attenuation produced by the first FET 18 is sufficient for the distortion to be acceptably low not only in the first FET but in the second as well.

Figure 6:
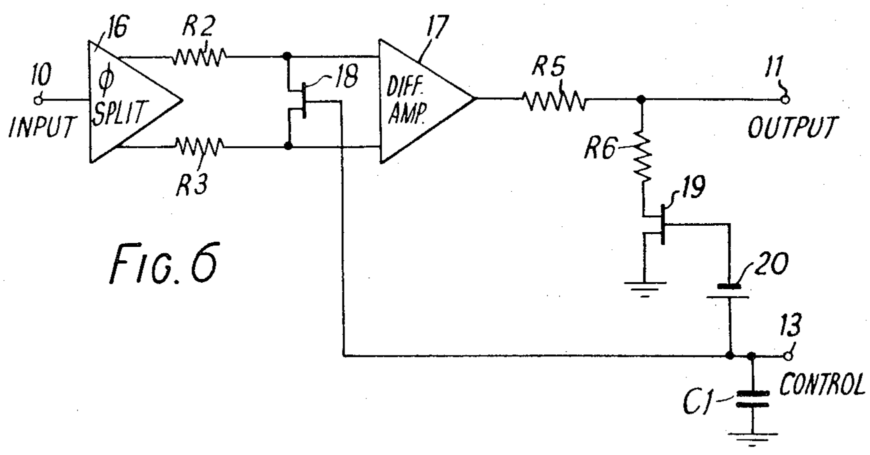

FIG. 6 illustrates one way of combining FIGS. 3 and 4. Since the first FET 18 is the primary source of distortion, only this FET is shown in a push-pull balanced configuration although both stages could be push-pull if required.

The extension of FIGS. 4, 5 and 6 to add a third FET attenuator stage (or any number of additional stages) will be obvious.

The embodiments of the invention in which an exclusive property or privilege is claimed are defined as follows:

1. A limiter circuit comprising an input, an output, and a control terminal, a signal path extending from the input to the output and including a plurality of series impedances, a plurality of field effect transistors having source-drain circuits shunting the signal path and gates connected to the control terminal for control, by a control voltage, of the attenuation introduced by the transistors, the transistors following the series impedances respectively and the circuit being constructed and arranged to establish different thresholds of the control voltage at which the transistors start to conduct.

2. A limiter circuit according to claim 1, comprising means establishing bias voltage differences between the gates to provide the different thresholds.

3. A limiter circuit according to claim 1, wherein the thresholds are ordered whereby the transistors start conducting in order, starting from that nearest the input, in response to an increasing control voltage.

4. A limiter circuit according to claim 1, wherein there are only two transistors.

5. A limiter circuit according to claim 1, wherein the signal path includes a phase splitter connected to the limiter input, at least the transistor nearest the limiter input shunting the output of the phase splitter.

* * * * *

(28688-Div.)

PO-1050
(5/69)

UNITED STATES PATENT OFFICE
CERTIFICATE OF CORRECTION

Patent No. 3,818,244 Dated June 18, 1974

Inventor(s) Ray Milton Dolby and David Peter Robinson

It is certified that error appears in the above-identified patent and that said Letters Patent are hereby corrected as shown below:

On the Title Page, Item [73] Assignee:
change "Dolley Laboratories, Inc."
to --Dolby Laboratories, Inc.--

Item [22] Filed:
change "March 6, 1973" to
--March 26, 1973--.

Signed and sealed this 5th day of November 1974.

(SEAL)
Attest:

McCOY M. GIBSON JR.
Attesting Officer

C. MARSHALL DANN
Commissioner of Patents